(12) United States Patent
Brewer, III

(10) Patent No.: US 7,798,464 B2
(45) Date of Patent: Sep. 21, 2010

(54) TWIST LOCK SHIPBOARD VIBRATION MOUNTING SYSTEM FOR PRINTERS/COPIERS

(75) Inventor: Charles R. Brewer, III, Farmington, NY (US)

(73) Assignee: Xerox Corporation, Norwalk, CT (US)

( * ) Notice: Subject to any disclaimer, the term of this patent is extended or adjusted under 35 U.S.C. 154(b) by 728 days.

(21) Appl. No.: 11/803,401

(22) Filed: May 14, 2007

(65) Prior Publication Data
US 2008/0283721 A1 Nov. 20, 2008

(51) Int. Cl.
*F16M 5/00* (2006.01)
*F16M 11/00* (2006.01)
*F16F 7/00* (2006.01)

(52) U.S. Cl. ........................ 248/638; 248/560; 248/618; 248/632; 267/141.4; 267/140.5; 267/153

(58) Field of Classification Search ................ 248/638, 248/560, 618, 621, 634, 636, 354.1, 354.3, 248/188.1, 188.5, 188.2; 267/136, 141.4–141.7, 267/140.3, 140.5, 153
See application file for complete search history.

(56) References Cited

U.S. PATENT DOCUMENTS

| | | | | |
|---|---|---|---|---|
| 2,407,588 A | * | 9/1946 | Thiry | ........................ 267/141.3 |
| 2,562,195 A | * | 7/1951 | Lee | ........................ 267/140.13 |
| 5,651,535 A | * | 7/1997 | David | ........................ 267/140.5 |
| 5,890,695 A | | 4/1999 | Brewer, III | |
| 6,015,131 A | | 1/2000 | Brewer, III | |
| 6,442,906 B1 | * | 9/2002 | Hwang | ........................ 52/126.6 |

* cited by examiner

*Primary Examiner*—Anita M King
(74) *Attorney, Agent, or Firm*—James J. Ralabate

(57) ABSTRACT

This is a mounting support that secures an electrostatic marking machine to the deck of a ship or other structure. This support provides vibration-isolating systems for shipboard mounting of these marking machines. The US Navy has imposed strict one-man, short-time requirements to mount and unmount electrostatic marking machines on a ship's deck. A key feature of the present embodiments is a double-threaded stud that lifts the machine off the floor onto the isolation mounts while securing it to the mount which is bolted to the ship's deck. The present configuration satisfies the new Navy mandate.

14 Claims, 2 Drawing Sheets

TWIST LOCK SHIPBOARD VIBRATION MOUNTING SYSTEM FOR PRINTERS/COPIERS

This invention relates to marking apparatus and, more specifically, to a support for said apparatus structure.

BACKGROUND

In electrostatic marking systems, it is known to use drums or flexible belt electrostatographic imaging members such as photoconductive or dielectric belts. Generally, in such systems, a latent image charge pattern is formed on these uniformly charged photoconductive or dielectric members. Pigmented marking particles (toner) are attracted to the latent image charge pattern to develop the image on the photoconductive member. A receiving member such as paper is then brought into contact with the photoconductive member and an electric field applied to transfer the marking particle developed image to the receiving member from the photoconductive member. After transfer, the receiving member bearing the transferred image is transported away from the photoconductive member and the image is fixed or fused at the receiving member by heat and/or pressure to form a permanent reproduction thereon. The flexible belt or the drum is arranged to move in an endless path through various processing stations of the Xerographic process. Each station performs precise activities such as precise charging, development, fusing, alignment and the like. If any of these stations, even one, is not precisely functioning or in misregistration, the entire system will be adversely affected Sometimes, copies made in electrostatic marking systems and other systems have defects caused by a plurality of possible causes including improper fusing, toner contaminants, charging problems, defects in the photoconduction belt, an unstable copier housing or a combination of these. Embodiments of this invention will address unstable copier problems.

Precise image alignment is critical in each station, not only in color marking systems but also in monochrome systems. The slightest misalignment caused by vibration or other conditions can be detrimental to the final image in these systems. Absence of vibration, especially in marine vehicles, is essential since vibration could cause misalignment and image distortion and degradation.

While present embodiments will be defined for clarity in relation to an electrostatic marking system it is to be understood that embodiments of the present invention may be used in any suitable marking system where machine stability is necessary. Also, for clarity, the support structure of this disclosure will be described in relation to the installation of a marking apparatus on a ship's deck. This structure can also be used on airplanes, any moving vehicle or apparatus or in earthquake-prone areas.

SUMMARY

In meeting specifications for installing copiers or marking apparatus onboard ships for commercial and government use, very rigid requirements have been present Applicant. For example, to meet U.S. Navy contract requirements, very precise needs for service time to disconnect and move printers or copiers for repairs are set out. Also, use and performance producing only high quality prints are a necessity since often precise copies are the only copies usable for certain purposes. There is a pressing need to provide a vibration-isolating system for shipboard mounting of Xerox and other marking machines. "Xerox" is a registered trademark of Xerox Corporation. Typical description of mount units is disclosed in U.S. Pat. Nos. 5,890,695 and 6,015,131. The disclosures of these two patents are incorporated by reference into the present disclosure.

The present embodiment incorporates the machine base plate in the design of the vibration-isolating system. The mounts are designed in two parts. The top section secures to the machine base plate. This upper half will contain the rotating section used to attach and lift the machine onto the vibration isolator. The lower portion of the mount will have the preformed steel plate used to attach the vibration isolator to the ship's deck, the rubber isolator and the receiver for the top half rotating coupler. The number of these mounts used per machine will depend on the size and configuration of the machine such as HCF units and finishers.

As seen in the attached drawings, an embodiment of the present invention would be to have the threaded tube contain both internal threads. The threads would be right hand. The top plate can secure to a printer/copier base by some mechanical means. The threaded stud attached to the top plate will have mating right hand threads. The fixed threaded socket will have the mating right hand threads for the threaded tube. When positioning the machine, the top plate and threaded tube will be attached to the underside of the base plate. Once aligned, the threaded tube will then be rotated to engage the shockmount with the fixed threaded socket. As the threaded tube is tightened into the fixed threaded socket, the machine will be lifted onto the shockmount by means of the different thread pitch inside the threaded tube. Once tightened, the machine is locked in place. This embodiment satisfies US Navy shipboard shock mount designs. This allows Xerox to meet Navy contract requirements for service time to disconnect and move printers/copiers for repair. Other previously-used systems do not allow such flexibility.

The present mounting system utilizes a neoprene-based vibration-absorbing material molded into a conical circular shape to provide mechanical properties needed. A heavy metal part or "hat section" is used to secure the system to a ship's deck. This includes the vibration mount and associated hardware to secure to the printer.

The twist lock design of this embodiment will utilize a hub that will be attached to the printer base plate. This will be part of the locking mechanism that will secure and lift the machine onto the vibration mount. Previous mounting supports used only used common hardware (bolts and nuts) to secure the chassis to the base plate of the printer. All of this hardware had to be removed before the printer could be moved. In the present embodiments, no parts or hardware will need to be removed. Thus, in the present structure, both the lifting and locking means will be accomplished in one step and motion, that is, to rotate the threaded shaft.

The present embodiments will allow flexibility of design of the printing system configuration in that they allow addition of more mounts in strategic locations to accomplish the task of isolating the machine from vibration. A prior art design allowed only one mount per machine with rigid requirements for configuration.

In recent contracts, the US Navy has imposed a one man time maximum requirement to mount and unmount Xerox printers onboard Naval vessels. In an embodiment, a key feature enabling quick mount and dismount is a double-threaded stud that lifts the machine off the floor onto the isolation mounts while securing it to the mount which is bolted to the ship's deck. This embodiment describes the design of a double-threaded, right hand OD, right hand ID (or the other) mounting stud with different pitches which enables the new mandate. As earlier noted, the stud that is part of the machine base lifts the machine when the OD is rotated about a fixed sleeve. By rotating the stud in the same direction, but with a different pitch, the stud locks the machine in position on the isolations pad. The mounts have completed and passed all necessary internal vibration testing. The old prior art shipboard mount designs could not meet the new requirement.

BRIEF DESCRIPTION OF THE DRAWINGS

FIG. 1 is a schematic front view of a support embodiment as it is attached to a ship's deck and supporting a copier/printer base plate.

DETAILED DISCUSSION OF DRAWINGS AND PREFERRED EMBODIMENTS

Figure 2:
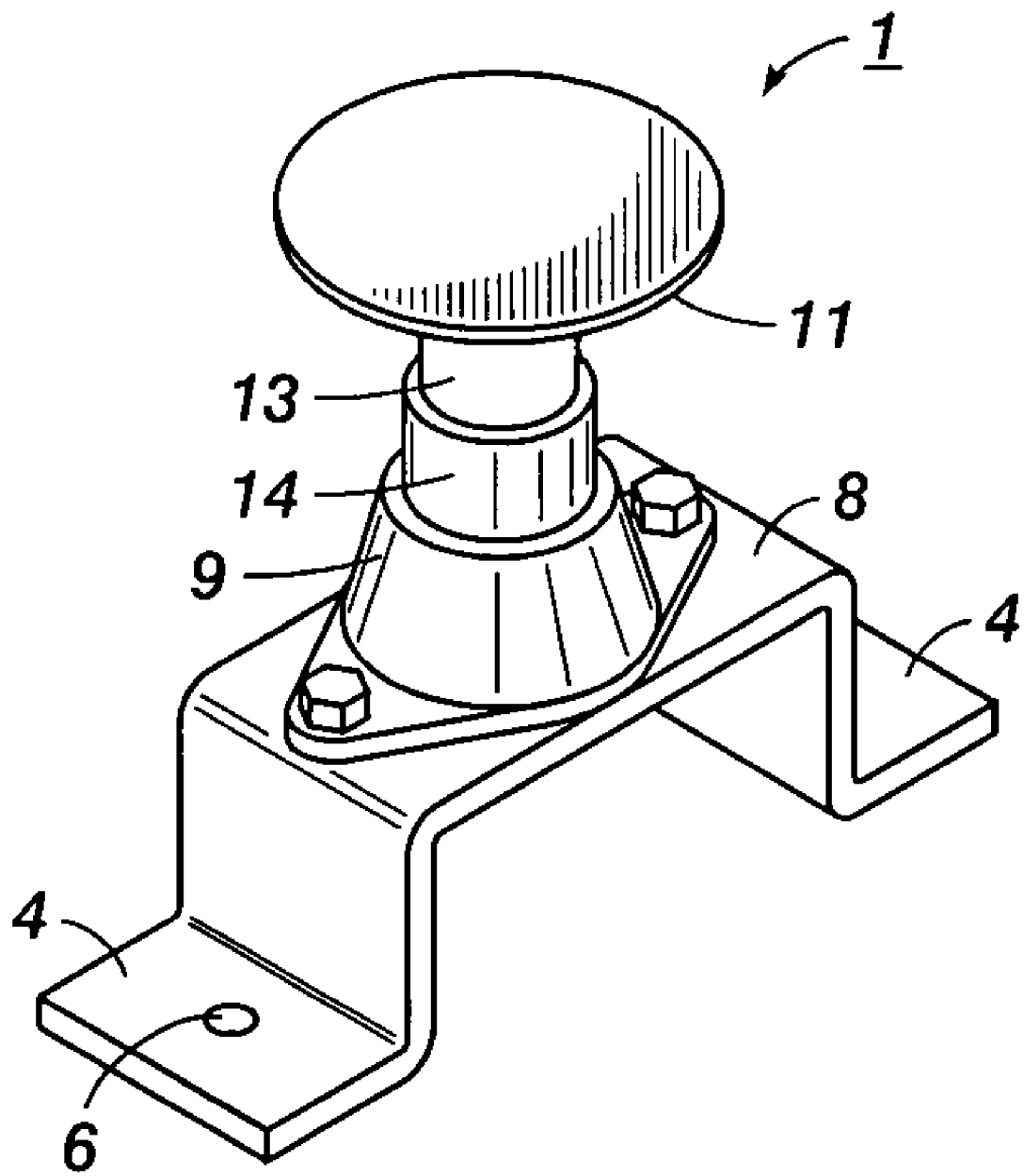
FIG. 2 is a top perspective view of a support embodiment of this invention corresponding to the support structure of FIG. 1.

In FIG. 1, a shipboard vibration mounting or support embodiment 1 is shown as it is securely attached to a ship's deck 2 by bolts or by welding. The support 1 comprises an inverted U-shaped, raised metal base 3 having flanges 4 at its terminal ends. The flanges 4 are attached to deck 2 by any suitable means such as being welded or attached by bolts 5 as shown in the drawings. To accommodate the bolts, apertures 6 are located in each flange 4 where a bolt 5 can pass through and be secured by a nut 7. On the roof portion 8 of the base 3 is attached a rubber shockmount 9 which absorbs any vibration and prevents misalignment or disruption of the electrostatic marking apparatus (not shown) supported by a base plate 10 fixed to said marking apparatus. Below the base plate 10 is a top plate 11 with a threaded stud 12. An internally and externally threaded tube 13 is telescopically movably positioned in a fixed, internally-threaded socket 14.

As noted, adjustable threaded tube 13 contains both internal and external threads. The internal threads would be left hand while the external threads right hand. The top plate 11 can secure to a printer/copier base by some suitable mechanical means. The threaded stud 12 attached to the top plate 11 will have mating left hand threads. The fixed threaded socket 14 will have the mating right hand threads for the threaded tube. When positioning the machine, top plate 11 and adjustable threaded tube 13 will be attached to the underside of the base plate 3. Once aligned, the threaded tube 13 will then be rotated to engage the shockmount 9 with the fixed threaded socket 14. As the threaded tube 13 is adjustably tightened into the fixed threaded socket 14, the machine will be lifted onto the shockmount by means of the opposite direction thread inside the threaded tube 13. Once tightened, the marking machine and base plate 10 are locked in place. This follows previous patents Xerox owns that encompass US Navy shipboard shockmount designs. It allows Xerox to meet Navy contract requirements for service time to disconnect and move printers/copiers for repair. Other systems do not allow such flexibility.

In FIG. 2, a top perspective view of the mounting support 1 is shown. A top plate 11 will fit against the copier base plate 10, any number of supports 1 may be used to support a marking machine, thus any suitable number of top plates 11 will be in support contact with the copier base plate 10 which supports the marking machine. As the top plate is adjusted upward by adjusting threaded tube 13, the marking machine is secured. As the top plate is lowered, the marking machine is removable for repair or other reasons.

Figure 3A:
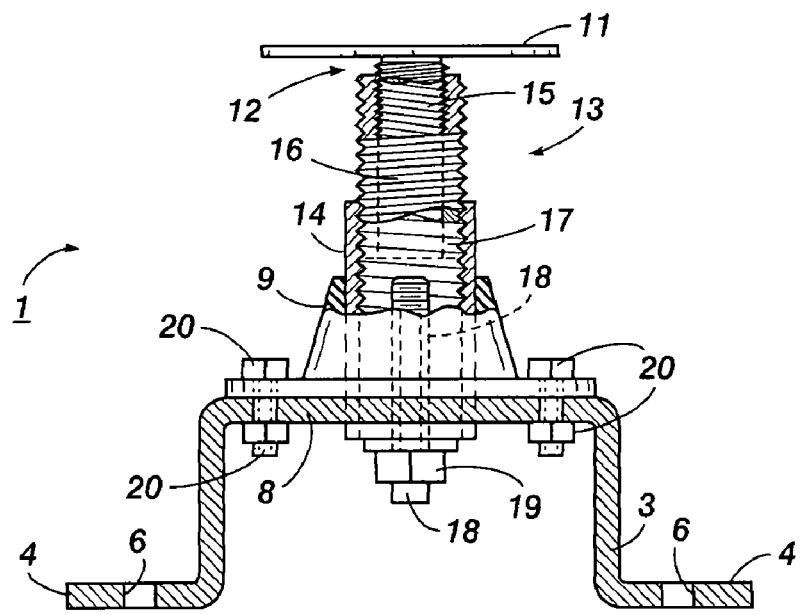
FIGS. 3A and 3B illustrate front and side views of an embodiment of this invention.
Figure 3B:
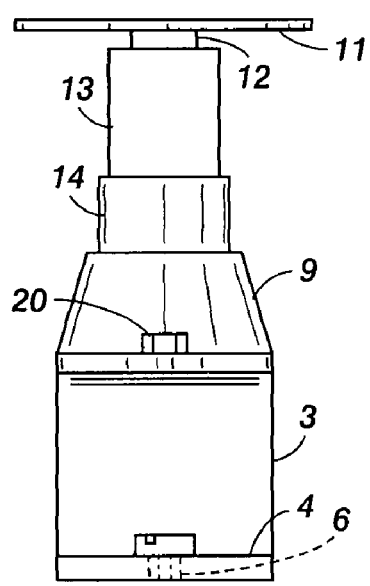

In FIGS. 3A and 3B, adjustable threaded tube 13 is threaded inside with threads 15 and outside with threads 16. Threads 16 mesh with the internal threads 17 of fixed socket 14. This permits top plate 11 to be moved up and down when tube 13 is adjusted. Fixed socket 14 has an attachment bolt 18 which runs downward through the rubber shockmount 9 and is fixed on the lower part of roof base 8 by a securing nut 19. Nuts 20 secure the base 3 to the remainder of mounting support 1. The present embodiments incorporate the marking machine base plate 10 in the structure of the vibration-isolating system. The mounts are designed into parts. The top section (12, 13 and 14) secures to the machine base plate 10. The lower portion of the mount (3, 4, 7 and 8) will have preformed steel base plate 3 used to attach the vibration isolator 9 to the ship's deck 2, the rubber isolator 9 and the receiver for the top half rotating coupler (13 and 14). As earlier noted, the number of mounts 1 used per machine will depend on the size and configuration of the marking machine.

In summary, embodiments of this invention provide a support mount adapted to prevent or minimize a vibration adversely affecting a structure supported thereon. The mount comprises in an operative arrangement a raised base, a vibration-absorbing shockmount and a movable top plate. The top plate is enabled to fit against a base plate of the structure supported thereon. The top plate is movably connected to an adjusting assembly, the assembly comprising a movable threaded tube telescopically fitted into a fixed socket. This adjusting assembly abuts the vibration absorbing shockmount. The movable threaded tube has both internal and external threads, where the external threads are movable within the socket. The socket has mating internal threads that are movable against external threads of the movable threaded tube. The top plate and the threaded tube are enabled to raise or lower the structure when positioning the structure. The raised base is enabled to be securely attached to a substantially immovable foundation so as to prevent movement of the mount or the structure when it is confronted by vibration.

In a more specific embodiment, a support or mount adapted to provide support for an electrostatic marking apparatus is provided which comprises in an operative arrangement a raised base, a flexible vibration-absorbing shockmount, a threaded fixed socket, a threaded tube and a base plate. The base plate is enabled to be secured to a bottom portion or base plate of the electrostatic marking apparatus. The base plate has an adjusting assembly that provides upward and downward movement to the base plate. The adjusting assembly comprises an internally and externally threaded tube in movable, telescoping relationship to a fixed, internally threaded socket. The externally threaded tube portion is enabled to mate with and be movable when screwed against an internal threaded portion of the fixed socket. The flexible shockmount is enabled to provide a cushion for the electrostatic marking apparatus whereby any vibration will be absorbed by the shockmount before it reaches and affects the supported electrostatic marking apparatus. The top plate and the adjusting assembly are enabled to raise and lower the supported electrostatic marking apparatus when required to repair, install or remove the apparatus.

The support in one embodiment is securely attached to a ship deck. The base plate and marking apparatus supported thereon is mounted on and supported by at least two of the supports or mounts. The support in an embodiment is secured to a member selected from the group consisting of ships, trains, boats, airplanes, land-based structures and mixtures thereof. The raised base has an inverted U-shaped configuration having horizontally-disposed flanges on both terminal ends of the flanges. This raised base has flanges providing attaching portions enabled to be fixed to a support selected from the group consisting of ships, trains, boats, airplanes, land-based structures and mixtures thereof.

The shockmount is made from a material enabled to effectively absorb vibration and prevent the vibration from reaching the electrostatic marking apparatus. In several embodiments the shockmount is made from a material selected from the group consisting of rubber, neoprene, elastomers, rubberized materials and mixtures thereof. The raised base, the fixed socket, the base plate and the threaded tube are constructed of a steel composition or other structurally hard material(s) such as substantially unbreakable plastics or synthetic products. The base plate is mounted on more than two of the supports or mounts depending upon the size and configuration of the electrostatic marking apparatus. The shockmount is immovably positioned above and supported by the raised base, and the socket is substantially immovably positioned above the shockmount. The threads positioned internally in the tube will when moved or adjusted mesh with the threaded stud, and the external threads of the tube will mesh with the internal threads of the socket. Thus, the threaded tube has internal threads that will mesh with the thread stud, and the external threads of the tube will mesh with the internal threads of the socket to thereby enable movement or adjustment of the tube to thereby move the base plate and electrostatic jarring machine in an upward or downward direction.

While the embodiments of this invention have been described in relationship to support of an electrostatic marking machine on a ship, it is to be understood that the disclosed embodiments may be used as supports for stabilizing any machine against vibration. This disclosed support, while exceptionally suitable for use on a ship, can be used on land, especially in earthquake-prone areas.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A support or mount adapted to provide support for an electrostatic marking apparatus, said support or mount which comprises in an operative arrangement a raised base, a flexible vibration-absorbing shock mount, a threaded fixed socket, a movable top plate, a threaded tube and a base plate,
   said base plate enabled to be secured to a bottom portion of said electrostatic marking apparatus,
   said base plate having an adjusting assembly that provides upward and downward movement to said base plate,
   said adjusting assembly comprising said threaded tube, said threaded tube being an internally and externally threaded tube in movable, telescoping relationship to said threaded fixed socket, said internally and externally threaded tube enabled to mate with and movable against an internal threaded portion of said threaded fixed socket,
   said flexible vibration-absorbing shock mount enabled to provide a cushion for said electrostatic marking apparatus whereby any vibration will be absorbed by said flexible vibration-absorbing shock mount before it reaches said electrostatic marking apparatus.

2. The support or mount of claim 1 wherein said movable top plate and said adjusting assembly are enabled to raise and lower said electrostatic marking apparatus when required to install or remove said apparatus.

3. The support or mount of claim 1 wherein said support is securely attached to a ship deck.

4. The support or mount of claim 1 wherein said base plate is mounted on at least two of said supports or mounts.

5. The support or mount of claim 1 wherein said support is secured to a member selected from the group consisting of ships, trains, boats, airplanes, land-based structures and mixtures thereof.

6. The support or mount of claim 1 wherein said raised base has flanges providing attaching portions enabled to be fixed to the support or mount selected from the group consisting of ships, trains, boats, airplanes, land-based structures and mixtures thereof.

7. The support or mount of claim 1 wherein said shock mount is made from a material enabled to effectively absorb vibration and prevent said vibration from reaching said electrostatic marking apparatus.

8. The support or mount of claim 1 wherein said shock mount is made from a material selected from the group consisting of rubber, neoprene, elastomers, rubberized materials and mixtures thereof.

9. The support or mount of claim 1 wherein said raised base, said fixed socket, said base plate and said threaded tube are constructed of a steel composition.

10. A support or mount adapted to provide support for an electrostatic marking apparatus which comprises in an operative arrangement,
    a top plate with a threaded stud, a raised base, a flexible, vibration-absorbing shock mount, a fixed internally threaded socket, an adjusting assembly, a threaded tube and a base plate, said base plate enabled to be secured to a bottom portion of said electrostatic marking apparatus, said base plate comprising said adjusting assembly that provides upward and downward movement to said base plate, said threaded tube comprising an internally and externally threaded tube in movable telescoping relationship to said fixed internally threaded socket, said internally and externally threaded tube enabled to mate with and movable against said fixed internally threaded socket,
    said flexible vibration-absorbing shock mount enabled to provide a cushion for said electrostatic marking apparatus whereby any vibration will be absorbed by said shock mount before it reaches said electrostatic marking apparatus, and
    wherein said top plate and said adjusting assembly are enabled to raise and lower said electrostatic marking apparatus when required to install or remove said apparatus when securely installed on a ship's deck.

11. The support or mount of claim 10 wherein said base plate is mounted on at least two of said supports or mounts depending upon the size and configuration of said electrostatic marking apparatus.

12. The support or mount of claim 10 wherein said shock mount is immovably positioned above and supported by said raised base, and said socket is immovably positioned above said shock mount.

13. The support or mount of claim 10 wherein threads positioned internally in said tube will mesh with the threaded stud, and wherein the external threads of said tube will mesh with the internal threads of said socket.

14. The support or mount of claim 10 wherein said threaded tube has internal threads that will mesh with the thread stud, and wherein the external threads of said tube will mesh with the internal threads of said socket to thereby enable movement or adjustment of said tube to move said base plate in an upward or downward direction.

* * * * *